(12) United States Patent
Neuman

(10) Patent No.: US 7,080,177 B2
(45) Date of Patent: Jul. 18, 2006

(54) SYSTEM AND METHOD FOR ARBITRATING CLIENTS IN A HIERARCHICAL REAL-TIME DRAM SYSTEM

(75) Inventor: Darren Neuman, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 757 days.

(21) Appl. No.: 10/218,533

(22) Filed: Aug. 14, 2002

(65) Prior Publication Data

US 2003/0167294 A1     Sep. 4, 2003

Related U.S. Application Data

(60) Provisional application No. 60/361,143, filed on Mar. 1, 2002.

(51) Int. Cl.
| | |
|---|---|
| G06F 12/00 | (2006.01) |
| G06F 13/14 | (2006.01) |
| G06F 13/38 | (2006.01) |
| G06F 3/00 | (2006.01) |
| G06F 12/14 | (2006.01) |

(52) U.S. Cl. ................... 710/240; 710/40; 710/41; 710/243; 710/244; 711/147; 711/151; 718/102; 718/104

(58) Field of Classification Search ............... 710/240, 710/243–244, 40–41; 711/147, 157; 718/102, 718/104
See application file for complete search history.

(56) References Cited

U.S. PATENT DOCUMENTS

| | | | | |
|---|---|---|---|---|
| 5,887,143 A | * | 3/1999 | Saito et al. ................. | 709/248 |
| 5,903,283 A | * | 5/1999 | Selwan et al. .............. | 345/535 |
| 6,006,303 A | * | 12/1999 | Barnaby et al. ............ | 710/244 |
| 6,157,978 A | * | 12/2000 | Ng et al. .................... | 710/240 |
| 6,189,064 B1 | * | 2/2001 | MacInnis et al. ........... | 710/244 |
| 6,205,524 B1 | * | 3/2001 | Ng .............................. | 711/151 |
| 6,473,821 B1 | * | 10/2002 | Altmayer et al. ........... | 710/240 |
| 6,498,798 B1 | * | 12/2002 | Krishnamoorthy et al. . | 370/537 |
| 6,611,908 B1 | * | 8/2003 | Lentz et al. ................ | 712/29 |

(Continued)

OTHER PUBLICATIONS

Jane W. S. Liu "Real-Time Systems", Prentice-Hall (2000).

(Continued)

Primary Examiner—Faisal Zaman
(74) Attorney, Agent, or Firm—McAndrews, Held & Malloy, Ltd.

(57) ABSTRACT

Systems and methods are disclosed for arbitrating requests from a plurality of clients requesting access to a shared real-time resource. In one embodiment, a plurality of sub-clients are aggregated into an aggregate client. At the aggregate client, access requests from the sub-clients are arbitrated to generate an aggregate request. An aggregate deadline is determined and access requests from the aggregate client and other clients are arbitrated using the aggregate deadline as the deadline of the aggregate client. In one embodiment, a critical instant analysis of the system is performed using the aggregate deadline as the deadline of the aggregate client. In another embodiment, a block-out counter is employed at an aggregate client to regulate the rate at which the aggregate client provides access requests to the shared resource. Access requests from the aggregate client and the other clients are then arbitrated, using $D_S/n$ as the deadline of the aggregate client, where $D_S$ is the shortest deadline among the n sub-clients. In yet another embodiment, the aggregate client employs a round-robin arbitration scheme and access requests from the aggregate client and the other clients are arbitrated using $D_S$ as the deadline of the aggregate client.

24 Claims, 12 Drawing Sheets

U.S. PATENT DOCUMENTS

2001/0056482 A1* 12/2001 Lewis et al. ............... 709/224
2002/0120763 A1*  8/2002 Miloushev et al. ......... 709/230
2003/0061260 A1*  3/2003 Rajkumar .................. 709/104

OTHER PUBLICATIONS

Liu, C.L. and J.W. Layland, "Scheduling Algorithms for Multiprogramming in a Hard Real-Time Environment", J. Assoc. Computing Machinery (ACM), vol. 20, pp. 46-61, 1973.

Leung J.Y.T. and J. Whitehead, "On the Complexity of Fixed-Priority Scheduling of Periodic, Real-TIme Tasks", Performance Evaluation (Netherlands), vol. 2, pp. 237-250, 1982.

Audsley, N.C., A. Burns, M.F. Richardson and A.J. Wellings, "Hard Real-Time Scheduling: The Deadline-Monotonic Approach", pp. 127-132 in Real-Time Programming, ed. W.A. Halang and K. Ramamritham, Pergamon Press, 1992.

* cited by examiner

FIG. 3
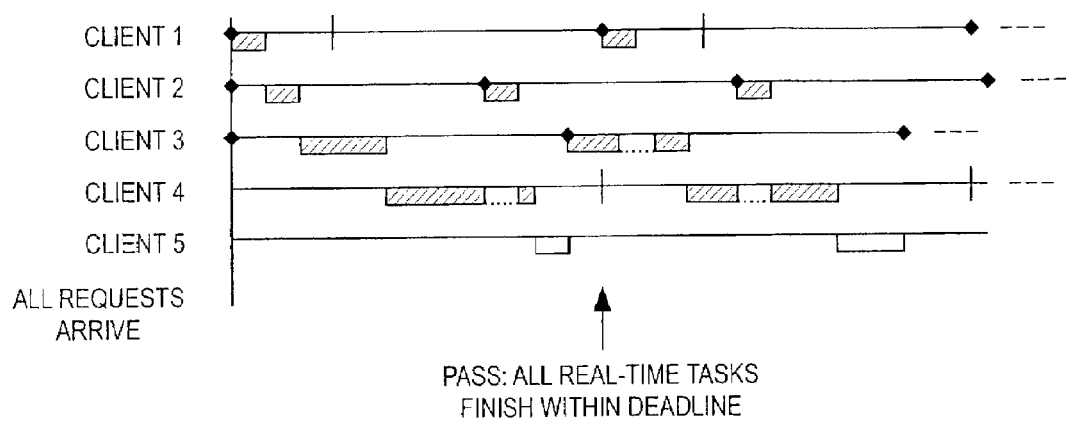
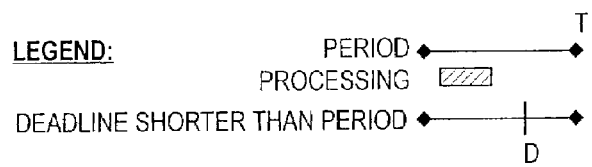

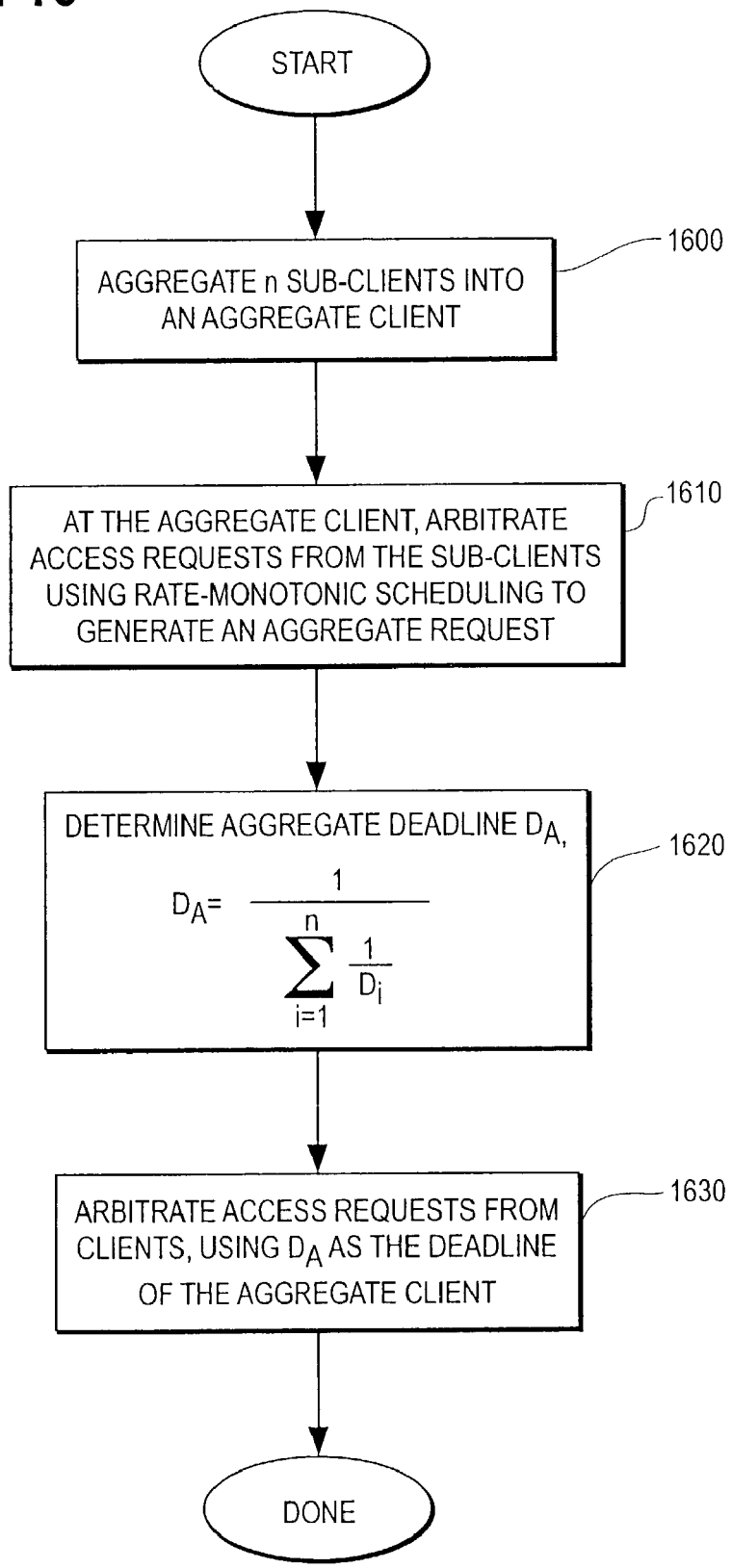

_US 7,080,177 B2_

SYSTEM AND METHOD FOR ARBITRATING CLIENTS IN A HIERARCHICAL REAL-TIME DRAM SYSTEM

CROSS-REFERENCE TO RELATED APPLICATIONS

The present application claims the benefit of the filing date of U.S. Provisional Patent Application 60/361,143, entitled "IMPROVEMENTS TO NON-PREEMPTIVE DRAM TRANSACTIONS IN REAL-TIME UNIFIED MEMORY ARCHITECTURES," filed Mar. 1, 2002, which is hereby expressly incorporated herein by reference in its entirety.

The present application is related to U.S. patent application Ser. No. 10/218,811, entitled "METHOD OF ANALYZING NON-PREEMPTIVE DRAM TRANSACTIONS IN REAL-TIME UNIFIED MEMORY ARCHITECTURES," and filed on even date herewith, which is hereby expressly incorporated herein by reference in its entirety.

BACKGROUND OF THE INVENTION

The present invention relates to real-time shared-resource transactions. More specifically, the present invention relates to client devices that have multiple sub-clients that periodically request access to the shared resource.

The problem of selecting which client gains access to DRAM is the same basic problem as solved in real time systems commonly used for scheduling tasks on a CPU, or scheduling access to a shared hardware resource. The theories in this area have been under development since the early 70's, and are reasonably advanced. While there are a number of approaches to scheduling, the simplest and possibly most robust is a static priority based schedule based on Rate Monotonic Scheduling.

Information about scheduling may be found in Janet Liu "Real-Time Systems", _Prentice-Hall_ (2000); Liu, C. L. and J. W. Layland, "Scheduling Algorithms for Multiprogramming in a Hard Real-Time Environment", _J. Assoc. Computing Machinery (ACM)_, vol. 20, pp. 46–61, 1973; Leung J. Y. T. and J. Whitehead, "On the Complexity of Fixed-Priority Scheduling of Periodic, Real-Time Tasks", _Performance Evaluation (Netherlands)_, vol. 2, pp. 237–250, 1982; Audsley, N. C., A. Burns, M. F. Richardson and A. J. Wellings, "Hard Real-Time Scheduling: the Deadline Monotonic Approach", pp. 127–132 in _Real-time Programming_, ed. W. A. Halang and K. Ramanritham, Pergamon Press, 1992; and commonly assigned U.S. Pat. No. 6,189,064, the complete subject matter of each of which is incorporated herein by reference in its entirety.

In certain unified memory architecture systems, a client splits the memory access internally among multiple modules and performs a second level arbitration within the client. In some systems, the second level of arbitration uses a round-robin scheme to evenly service a number of different types of memory access. Other types of second-level arbitration within a module are fixed scheduling as dictated by a control machine where the order of servicing and processing are controlled together between sub-modules. Left unconstrained, these clients show a very bursty pattern of requests to memory.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One embodiment of the present invention relates to a method of arbitrating requests for access to a shared real-time resource received from a plurality of client devices. According to the method, a plurality of sub-clients are aggregated into an aggregate client and access requests received from the aggregate client and a plurality of clients are arbitrated.

Another embodiment of the present invention relates to a method of analyzing the schedulability of a real-time system that employs rate monotonic scheduling or deadline monotonic scheduling to determine access priority of a plurality of client devices to a shared resource. Pursuant to the method, a plurality of sub-clients are aggregated into an aggregate client having an aggregate service deadline. A critical instant analysis of the system is performed, the system comprising the aggregate client and a plurality of other clients. The aggregate service deadline is utilized as the service deadline of the aggregate client for purposes of the critical instant analysis.

Another embodiment of the present invention is directed to a method of arbitrating requests for access to a shared real-time resource received from a plurality of client devices, one of the clients being an aggregate client comprising a plurality of sub-clients, wherein the aggregate client arbitrates among the sub-clients to provide an access request to the shared resource. According to the method, a minimum interval between successive access requests from the aggregate client is imposed and access requests received from the plurality of clients are arbitrated.

Yet another embodiment of the present invention is related to a method of analyzing the schedulability of a real-time system that employs rate monotonic scheduling or deadline monotonic scheduling to determine access priority of a plurality of client devices to a shared resource, one of the clients being an aggregate client comprising a plurality of sub-clients, wherein the aggregate client arbitrates among the sub-clients to provide an access request to the shared resource. Pursuant to this method, a minimum interval between successive access requests from the aggregate client is imposed. A critical instant analysis of the system comprising the plurality of clients is performed, utilizing the imposed minimum interval as the service deadline of the aggregate client for purposes of the critical instant analysis.

Another embodiment of the present invention is directed to a method of arbitrating requests for access to a shared real-time resource received from a plurality of client devices, one of the clients being an aggregate client comprising a plurality of sub-clients, wherein the aggregate client arbitrates among the sub-clients to provide an access request to the shared resource. According to this method, the shortest service deadline of the plurality of sub-clients is determined. Access requests received from the plurality of clients are arbitrated using rate monotonic scheduling or deadline monotonic scheduling. The shortest service deadline of the plurality of sub-clients is used as the service deadline of the aggregate client.

Still another embodiment of the present invention is directed to a method of analyzing the schedulability of a real-time system that employs rate mnonotonic scheduling or deadline monotonic scheduling to determine access priority of a plurality of client devices to a shared resource, one of the clients being an aggregate client comprising a plurality of sub-clients, wherein the aggregate client arbitrates among the sub-clients to provide an access request to the shared resource. Pursuant to the method, the shortest service deadline of the plurality of sub-clients is determined. A critical instant analysis of the system comprising the plurality of clients is performed. The shortest service deadline of the plurality of sub-clients is utilized as the service deadline of the aggregate client for purposes of the critical instant analysis. At the critical instant, the aggregate client produces access requests from each of the sub-clients in immediate succession. The aggregate client is preemptable after each sub-client is serviced by the shared resource.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

FIG. 3 is a timeline representing a simple critical instant analysis in accordance with an illustrative embodiment of the present invention.

FIG. 16 is a flowchart representing a method of arbitrating requests for access to a shared real-time resource received from a plurality of client devices according to an illustrative embodiment of the present invention.

DETAILED DESCRIPTION OF THE INVENTION

The following description is made with reference to the appended figures.

Improvements to memory fabrication technologies have resulted in denser memory chips. However memory chip bandwidth has not been increasing as rapidly. The bandwidth of a memory chip is a measure of how fast contents of the memory chip can be accessed for reading or writing. As a result of increased memory density without necessarily a commensurate increase in bandwidth, in many conventional system designs multiple memory devices are used for different functions, and memory space in some memory modules may go unused or is wasted. In one embodiment of the present invention, a unified memory architecture is used. In the unified memory architecture, all the tasks (also referred to as "clients"), including a CPU, a display engine and IO devices, for example, share the same memory.

The unified memory architecture may include a memory that is shared by a plurality of devices, and a memory request arbiter coupled to the memory, wherein the memory request arbiter performs real time scheduling of memory requests from different devices having different priorities. The unified memory system assures real time scheduling of tasks, some of which do not inherently have pre-determined periodic behavior and provides access to memory by requesters that are sensitive to latency and do not have determinable periodic behavior.

Figure 1:
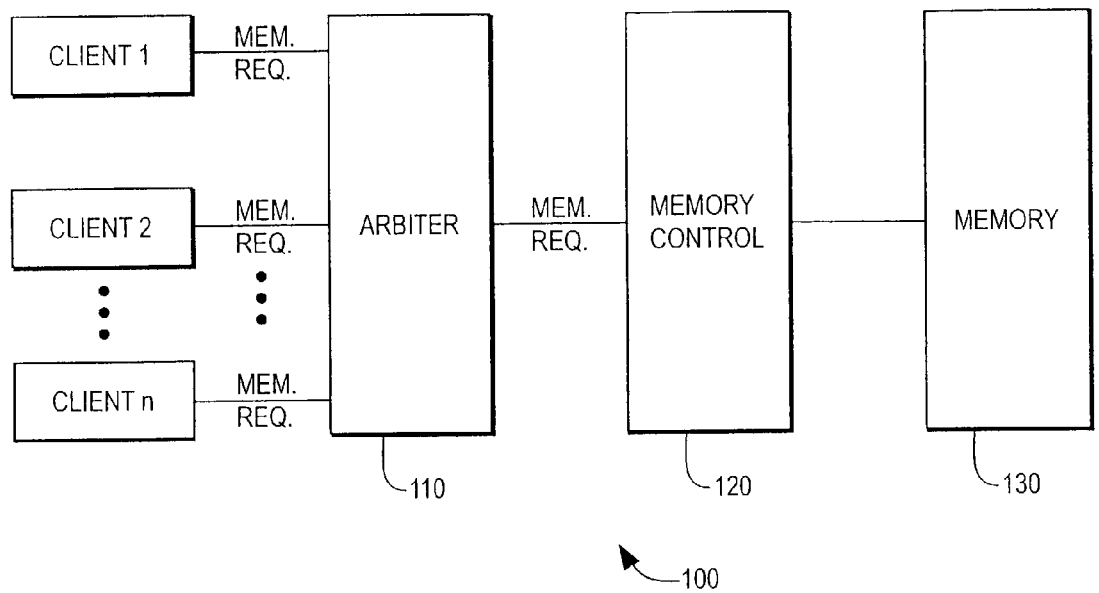
FIG. 1 is a functional block diagram representing a memory controller system according to an illustrative embodiment of the present invention.

FIG. 1 is a functional block diagram representing a memory controller system 100 according to an illustrative embodiment of the present invention. Memory requests are generated by client device 1, client device 2, and any number of additional client devices up to client device n. In an illustrative embodiment of the present invention one of the client devices is the CPU. These memory requests are provided to a memory access arbiter 110. The arbiter 110 arbitrates between/among requesting client devices to determine which client device will be granted access to memory at a given time. The arbiter 110 sends memory requests to a memory controller 120. In FIG. 1, the shared resource is the memory module 130. However, according to the present invention, the shared resource can be any device that serves as a resource to multiple client devices such as client devices 1 through n.

The memory controller 120 sends address and control signals to a memory module 130 and receives data from the memory module 130. In an illustrative embodiment of the present invention, memory module 130 is a DRAM module. The memory controller preferably provides data received from the memory module 130 to a device that requested the received data.

The arbiter 110 uses an improved form of real time scheduling to meet real-time latency requirements while improving performance for latency-sensitive tasks. When using a unified memory, memory latencies caused by competing memory requests by different tasks should generally be addressed. In one embodiment, a real-time scheduling and arbitration scheme for unified memory is implemented, such that all tasks that use the unified memory meet their real-time requirements. The methodology used implements real-time scheduling using rate monotonic scheduling (RMS). Rate monotonic scheduling is a mathematical approach that allows the construction of provably correct schedules of arbitrary numbers of real-time tasks with arbitrary periods for each of the tasks. This methodology provides for a straightforward means for proof by simulation of the worst-case scenario, and this simulation is simple enough that it can be done by hand.

In the simplest form, rate monotonic scheduling provides a means to prioritize clients based on their real-time needs. It also provides a test to determine if the system will pass or fail.

Information generally needed to implement this scheduling approach includes at least the following parameters describing the clients: (1) client devices are periodically requesting DRAM at a fixed rate T; (2) clients need a response from memory within the time of the next request (time+T); and (3) assumptions about the clients, such as independence and preemption.

RMS, as normally applied, makes a number of simplifying assumptions in the creation of a priority list. In the normal RMS assumptions, all tasks are assumed to have constant periods, such that a request for service is made by the task with stated period, and all tasks have a latency tolerance that equals that task's period. Latency tolerance is defined as the maximum amount of time that can pass from the moment the task requests service until that task's request has been completely satisfied. The end of a client device's latency tolerance period is sometimes referred to as its service deadline. During implementation of one embodiment of the present invention, the above assumptions have been modified, as described below.

In the RMS method, all tasks are generally listed along with their periods. They are then ordered by period, from the shortest to the longest, and priorities are assigned in that order. Multiple tasks with identical periods can be in any relative order. In other words, the relative order amongst them can be decided by, for example, flipping a coin.

Proof of correctness, i.e. the guarantee that all tasks meet their deadlines, is constructed by analyzing the behavior of the system when all tasks request service at exactly the same time; this time is called the "critical instant". This is the worst-case scenario, which may not occur in even a very large set of simulations of normal operation, or perhaps it may never occur in normal operation, however it is presumed to be possible. As each task is serviced, it uses the shared resource, (memory clock cycles in the present invention) in the degree stated by that task. If all tasks meet their deadlines, the system is guaranteed to meet all tasks' deadlines under all conditions, since the critical instant analysis simulates the worst case.

When the lowest priority real-time task meets its deadline, without any higher priority tasks missing their deadlines, then all tasks are proven to meet their deadlines. As soon as any task in this simulation fails to meet its deadline, the test has failed and the task set cannot be guaranteed, and therefore the design should preferably be changed in order to guarantee proper operation under worst case conditions.

The simplest model of a critical instant has clear initial conditions, run-time conditions, and clear end conditions. In simple preemptive systems, the initial conditions are the same for all clients, so only one run of the model is needed. However, in non-preemptive systems, the test should be run for each client device, as will be described below. In a preemptive system, if a request is received from a higher priority client while a lower priority client is being serviced by the common resource, the arbiter 110 interrupts the processing of the lower priority client's request and provides access to the shared resource to the higher priority client. In a non-preemptive system, if a request is received from a higher priority client while a lower priority client is being serviced by the shared resource, the lower priority is allowed to complete its transaction with the common resource before the higher priority client is granted access to the resource.

The initial conditions specify the starting point of a simulation that stresses the worst case for a system. Determining the worst case starting point may be challenging when there are deviations from the assumptions underlying rate monotonic scheduling. For any client (i) in a simple preemptive system, the worst case occurs when all higher priority clients (<i) request simultaneously. The priorities in the system must be assigned according to period as indicated above for rate monotonic scheduling.

The run-time conditions for a critical instant simulation in accordance with one embodiment of the present invention assume that all high priority clients request continuously at their periodic rate. Each client is serviced immediately if it has the highest priority request. Lower priority clients are serviced only when all higher priority requests have been served. Lower priority clients are interrupted, to service higher priority clients (note that this rule is modified in a non-preemptive system). If a client's request is not serviced prior to the end of its period, then the critical instant simulation fails.

The simulation of the critical instant continues until the period (and deadline) for the client (i) is completed. If the client (i) has been serviced, then the simulation passes. If it has not finished being serviced, then the simulation has failed and the system is declared not schedulable. In an illustrative embodiment of the present invention, the critical instant simulation is run for all clients, as each client may have different initial conditions, and different end conditions for pass/fail test.

Figure 2:
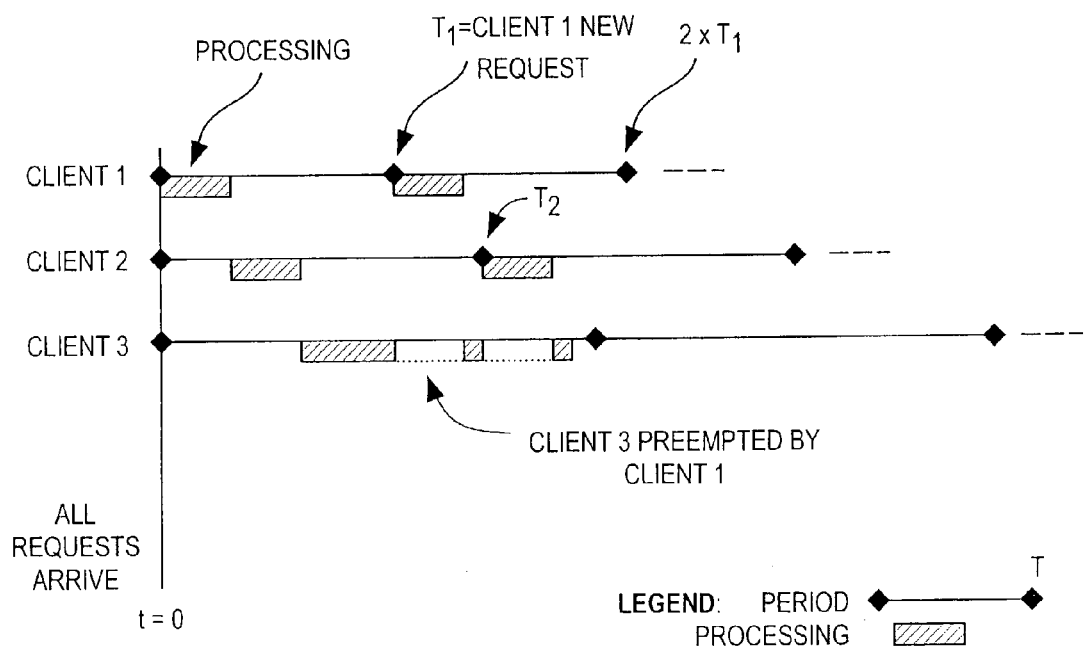
FIG. 2 is a timeline representing a simple critical instant analysis in accordance with an illustrative embodiment of the present invention.

FIG. 2 illustrates an example of a simple critical instant in a preemptive system. In the system represented in FIG. 2, all clients request periodically. Client 1 has the shortest period and therefore is assigned the highest priority. Client 3 has the longest period and is therefore assigned the lowest priority. At the critical instant, access requests arrive from all three clients at t=0. The arbiter 10 provides access to the shared resource first to client 1 because it has the highest priority. When client 1 completes its transaction with the common resource, i.e., when the shared resource is done servicing client 1, the arbiter grants access to client 2, which has the next highest priority. When client 2 has been serviced, servicing of client 3, the lowest priority client commences. At time $T_1$, a new request is received from client 1, and because this is a preemptive system and client 1 has the highest priority, the servicing of client 3 is interrupted and client 1 is granted access to the common resource. When client 1's new request is completely serviced, access to the shared resource is returned to client 3. At time $T_2$, a new request is received from client 1, and since client 2 has the higher priority, the servicing of client 3 is interrupted and client 2 is granted access to the common resource. When client 2's new request is completely serviced, access to the shared resource is returned to client 3. Client 3's transaction with the common resource is completed prior to its deadline at the end of its period. This is a successful end condition for the critical instant test for client 3. A test for critical instant for all three clients will show that this system is schedulable.

Note that if a system fails the test, and is not schedulable, changing the priorities will not fix it. The rate monotonic scheduling theory illustrates that the assigned priorities are optimal, so there are no improvements possible. The fix requires changes to hardware to improve the schedulability of the system.

The use of rate monotonic scheduling places design requirements on the clients that should be performed correctly for the entire system to work. A single ill-behaved client may cause the system to fail the schedulability test.

In the case of a failure, the ill-behaved client may be serviced, but a lower-priority client may be denied access to the common resource. Often times a failure in such a system does not show symptoms in the problematic module, but rather shows symptoms in low-priority modules, or in modules that do not degrade gracefully (hard failure).

In an illustrative embodiment of the present invention, the latency tolerance of a module is required to be equal to its requesting period. In an exemplary embodiment of the present invention wherein the shared resource is a DRAM module, a module that has regular accesses to DRAM incorporates a FIFO buffer that is 2× the size of the DRAM service burst. The FIFO generates a request to DRAM when it is half full. The client then relies upon the system to service the FIFO with the DRAM burst within the remaining time of a service period. If the client is reading from DRAM, the client must be designed so that it may operate for 1 service period with 1 burst of data in the FIFO. In the normal case, the FIFO is filled ahead of schedule, and the client will have more than one burst of data to work on. The client will not make additional requests if the FIFO is above the half full mark, so that there is no danger of the FIFO overflowing. In the critical instant, the client requests when the FIFO is half full. The client continues to operate on the half of the data that is in the FIFO, and the DRAM services and sends a burst to the FIFO just prior to the client emptying the FIFO. This maintains the FIFO at a level between half and nearly empty. For the purposes of critical instant analysis, the client is modeled to have the worst-worst-case behavior. This includes worst-case request rate, worst case page breaks, worst case size of DRAM transaction, etc.

The simulation of a critical instant generally indicates nothing about the bandwidth of a system. The critical instant analysis indicates if the system works in a real-time sense. That means that the real-time scheduling has been met, or has not been met. The simulation is a worst-worst case simulation, primarily to test the schedulability of the system with the rate-monotonic priority settings.

The system does not exhibit this worst-worst case behavior often, and additional bandwidth may be available when the system is not experiencing a critical instant. The critical instant is rare by design, so is not expected to happen often. However, if a system is designed to pass the critical instant, then it may operate in all normal modes of operation with regard to shared resource bandwidth.

There are a number of areas where real systems generally do not comply with the underlying assumptions of the rate monotonic scheduling approach.

Sporadic clients are those clients having no critical deadline. These are non-real-time clients, and are treated as low priority clients in the system. All real-time clients are prioritized above all sporadic clients. The sporadic clients do not have to pass a schedulability test from a critical instant analysis. In one embodiment, a round robin mechanism is used to allocate spare bandwidth to non-real time clients, effectively as a sporadic server.

It is contemplated that it may be necessary to characterize sporadic client behavior carefully, as they do enter into the analysis of the critical instant in non-preemptive modeling. In the non-preemptive initial conditions, a sporadic client may block other clients.

It is possible to have clients who request access to the shared resource with real-time deadlines, but do not have a periodic behavior. They may request access very rarely, but upon request have a definite deadline that needs to be serviced. In one embodiment, these clients are prioritized according to their deadline, rather than period (assuming deadline <=period). This is then treated the same in the critical instant as other clients. According to deadline monotonic scheduling, the critical instant analysis utilizes the deadline of the clients rather than the period to test for schedulability. Additionally, the client cannot request more frequently than its deadline. In the run-time conditions of the critical instant analysis, these clients are simulated to make a new request at the end of their deadline. Essentially, they are treated as a normal client with regular requests at their deadline time.

Some clients may have a strict periodic request with a deadline that is shorter than the period. In this case, the deadline monotonic scheduling rules apply (i.e., priorities are assigned according to deadline, not period). The critical instant initial conditions are unchanged from rate monotonic approach. The run-time conditions of the critical instant simulation have this client repeat requests at the periodic rate T, but the pass/fail check of the test is based on meeting the deadline D as illustrated in FIG. 3.

FIG. 3 is a timeline depicting a critical instant analysis with various types of clients. In FIG. 3, client 1 has a deadline that is shorter than its period. Client 1 is assigned the highest priority because it has the shortest deadline. Clients 2 and 3 are "normal" clients having periodic requests and deadlines equal to their respective periods. Client 4 has deadlines, but is non-periodic in requesting. Thus client 4 is treated as the worst case wherein requests are initiated after every deadline. Therefore, client 4 is prioritized according to its deadline and its run-time period defaults to its deadline. Client 5 is a sporadic server. With no deadline, it receives the lowest priority. Client 5 utilizes available bandwidth after all other clients are served. In an illustrative embodiment, this bandwidth is allocated via a round-robin mechanism to non-real-time clients. A test for critical instant shows that all clients are serviced by their respective deadlines. Therefore, the system is declared schedulable.

In practice, the tasks sharing the common resource sometimes do not all exhibit true periodic behavior. Clients having variable periods of request use the worst-case shortest period for critical instant analysis, and for prioritization. This type of behavior is quite poor for a module, and in the extreme may make a system unschedulable. Clients with variable deadlines (if the deadline is shorter than the period) use the shortest worst-case deadline for prioritization and critical instant analysis. Clients that have variable service times use the worst-case longest service time for critical instant analysis. This does not have any effect on prioritization, as priority is only a function of deadline. This is commonly an issue for modules which have differing numbers of DRAM page breaks depending on how the data requested is aligned on DRAM pages.

A common type of design which leads to variable behavior is one which does not make requests at a half-full FIFO level, but rather requests as soon as it is serviceable. This type of design generates a large number of small requests, and it is difficult to determine the deadline from the request pattern. The system analysis of such a design is very difficult or impossible in the worst case. This style of design is commonly called a 'leaky bucket' or near-full FIFO design.

In one embodiment of the present invention, a block-out timer, associated with a task that does not normally have a period, is used in order to force a bounded minimum interval, similar to a period, on that task. For example, a block-out timer associated with the CPU is been implemented in an illustrative embodiment of the present invention. If left uncontrolled, the CPU can occupy all available memory cycles, for example by causing a never-ending stream of cache misses and memory requests. At the same time, CPU performance is determined largely by "average latency of memory access," and so the CPU performance would be less than optimal if all CPU memory accessed were consigned to a sporadic server, i.e., at the lowest priority.

In this embodiment, the CPU task has been converted into two logical tasks. A first CPU task has a very high priority for low latency, and it also has a block-out timer associated with it such that once a request by the CPU is made, it cannot submit a request again until the block-out timer has timed out. In this embodiment, the CPU task has the top priority. In other embodiments, the CPU task may have a very high priority but not the top priority. In an illustrative embodiment of the present invention, the timer period is programmable for system tuning, in order to accommodate different system configurations with different memory widths or other options. In an illustrative embodiment of the present invention, the block-out timer is started when the CPU makes a high priority request.

A second CPU task is preferably serviced by a sporadic server in a round-robin manner. Therefore if the CPU makes a long string of memory requests, the first one is served as a high priority task, and subsequent requests are served by the low priority sporadic server whenever none of the real-time tasks have requests pending, until the CPU block-out timer times out. For example, the CPU read and write functions are grouped together and treated as two tasks. A first task has a theoretical latency bound of 0 and a period that is programmable via a block-out timer, as described above. A second task is considered to have no period and no deadline, and it is grouped into the set of tasks served by the sporadic server via a round robin at the lowest priority. The CPU uses a programmable block-out timer between high priority requests in this embodiment.

For another example, a graphics display task is considered to have a constant bandwidth of 27 MB/s, i.e., 16 bits per pixel at 13.5 MHz. However, the graphics bandwidth in one embodiment of the present invention can vary widely from much less than 27 MB/s to a much greater figure, for example, if 8 bits per pixel or 32 bits per pixel are used, but 27 MB/s is a reasonable figure for assuring support of a range of applications. For example, in one embodiment of the present invention, the graphics display task utilizes a block-out timer that enforces a period of 2.37 µs between high priority requests, while additional requests are serviced on a best-effort basis by the sporadic server in a low priority round robin manner.

Figure 4:
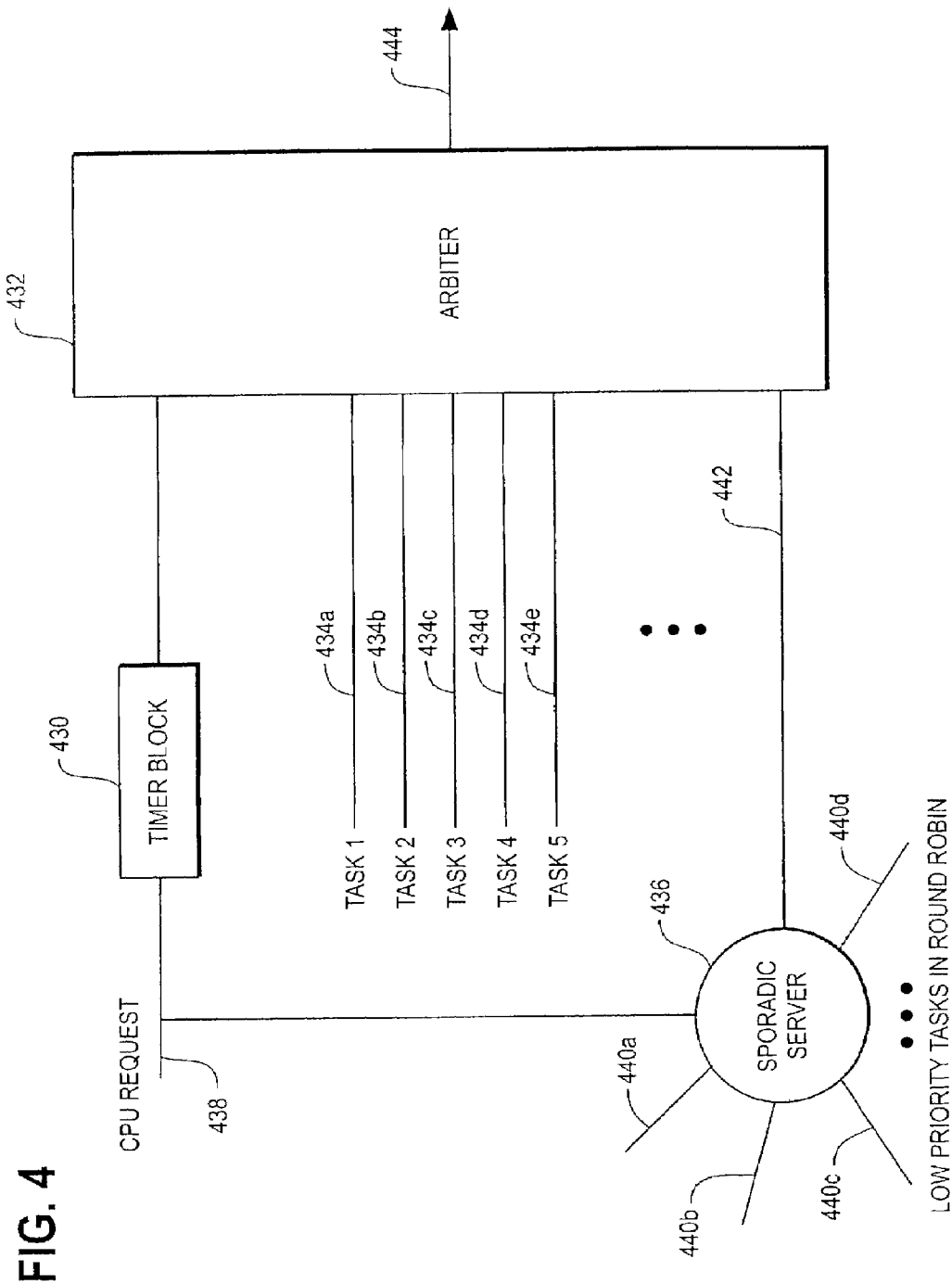
FIG. 4 is a functional block diagram representing a memory controller system according to an illustrative embodiment of the present invention.

Referring to FIG. 4, a block diagram illustrates an implementation of a real-time scheduling using an RMS methodology. A CPU service request 438 is preferably coupled to an input of a block-out timer 430 and a sporadic server 436. An output of the block-out timer 430 is preferably coupled to an arbiter 432 as a high priority service request. Tasks 1–5 434a–e may also be coupled to the arbiter as inputs. An output of the arbiter is a request for service of a task that has the highest priority among all tasks that have a pending memory request.

In FIG. 4, only the CPU service request 438 is coupled to a block-out timer. In other embodiments, service requests from other tasks may be coupled to their respective block-out timers. The block-out timers are used to enforce a minimum interval between two successive accesses by any high priority task that is non-periodic but may require expedited servicing. Two or more such high priority tasks may be coupled to their respective block-out timers in one embodiment of the present invention. Devices that are coupled to their respective block-out timers as high priority tasks may include a graphics accelerator, a display engine, and other devices.

In addition to the CPU request 438, low priority tasks 440a–d may be coupled to the sporadic server 436. In the sporadic server, these low priority tasks are handled in a round robin manner. The sporadic server sends a memory request 442 to the arbiter for the next low priority task to be serviced.

Figure 5:
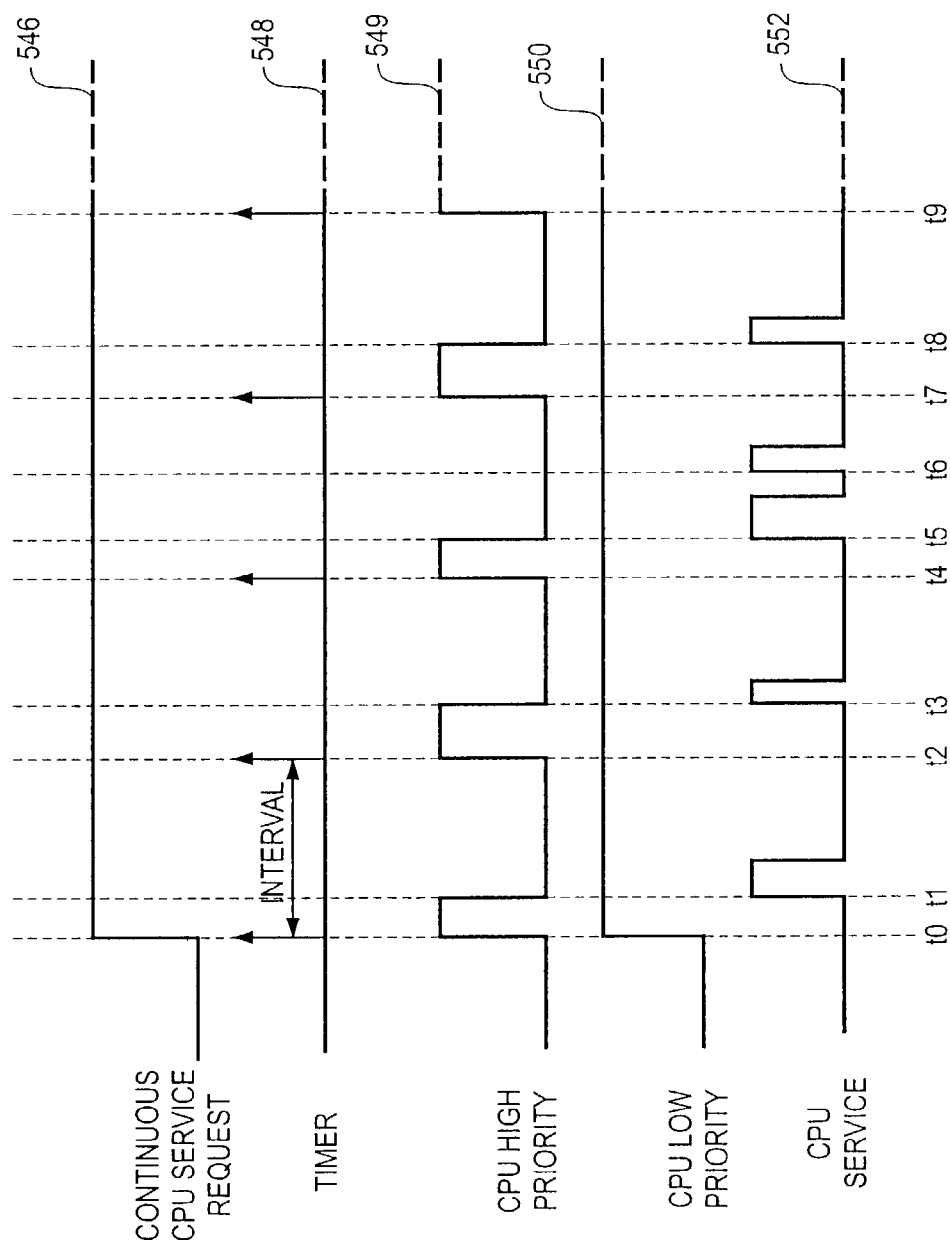
FIG. 5 is a timeline representing the operation of a block-out timer according to an illustrative embodiment of the present invention.

Referring to FIG. 5, a timing diagram illustrates CPU service requests and services in case of a continuous CPU request 546. In practice, the CPU request is generally not continuous, but FIG. 5 has been provided for illustrative purposes. In the example represented in FIG. 5, a block-out timer 548 is started upon a high priority service request 549 by the CPU. At time $t_0$, the CPU starts making the continuous service request 546, and a high priority service request 549 is first made provided that the block-out timer 548 is not running at time $t_0$. When the high priority service request is made, the block-out timer 548 is started. Between time $t_0$ and time $t_1$, the memory controller finishes servicing a memory request from another task. The CPU is first serviced at time $t_1$. In the preferred embodiment, the duration of the block-out timer is programmable. For example, the duration of the block-out timer may be programmed to be 3 µs.

Any additional high priority CPU request 549 is blocked out until the block-out timer times out at time $t_2$. Instead, the CPU low priority request 550 is handled by a sporadic server in a round robin manner between time $t_0$ and time $t_2$. The low priority request 550 is active as long as the CPU service request is active. Since the CPU service request 546 is continuous, another high priority service request 549 is made by the CPU and the block-out timer is started again as soon as the block-out timer times out at time $t_2$. The high priority service request made by the CPU at time $t_2$ is serviced at time $t_3$ when the memory controller finishes servicing another task. Until the block-out timer times out at time $t_4$, the CPU low priority request 550 is handled by the sporadic server while the CPU high priority request 549 is blocked out.

Another high priority service request is made and the block-out timer 548 is started again when the block-out timer 548 times out at time $t_4$. At time $t_5$, the high priority service request 549 made by the CPU at time $t_4$ is serviced. The block-out timer does not time out until time $t_7$. However, the block-out timer is not in the path of the CPU low priority service request and, therefore, does not block out the CPU low priority service request. Thus, while the block-out timer is still running, a low priority service request made by the CPU is handled by the sporadic server, and serviced at time $t_6$.

When the block-out timer 548 times out at time $t_7$, it is started again and yet another high priority service request is made by the CPU, since the CPU service request is continuous. The high priority service request 549 made by the CPU at time $t_7$ is serviced at time $t_8$. When the block-out timer times out at time $t_9$, the high priority service request is once again made by the CPU and the block-out timer is started again.

The schedule that results from the task set and priorities above is verified by simulating the system performance starting from the critical instant, when all tasks request service at the same time and a previously started low priority task is already underway. The system is proven to meet all the real-time deadlines if all of the tasks with real-time deadlines meet their deadlines. Of course, in order to perform this simulation accurately, all tasks make new requests at every repetition of their periods, whether or not previous requests have been satisfied.

Figure 6:
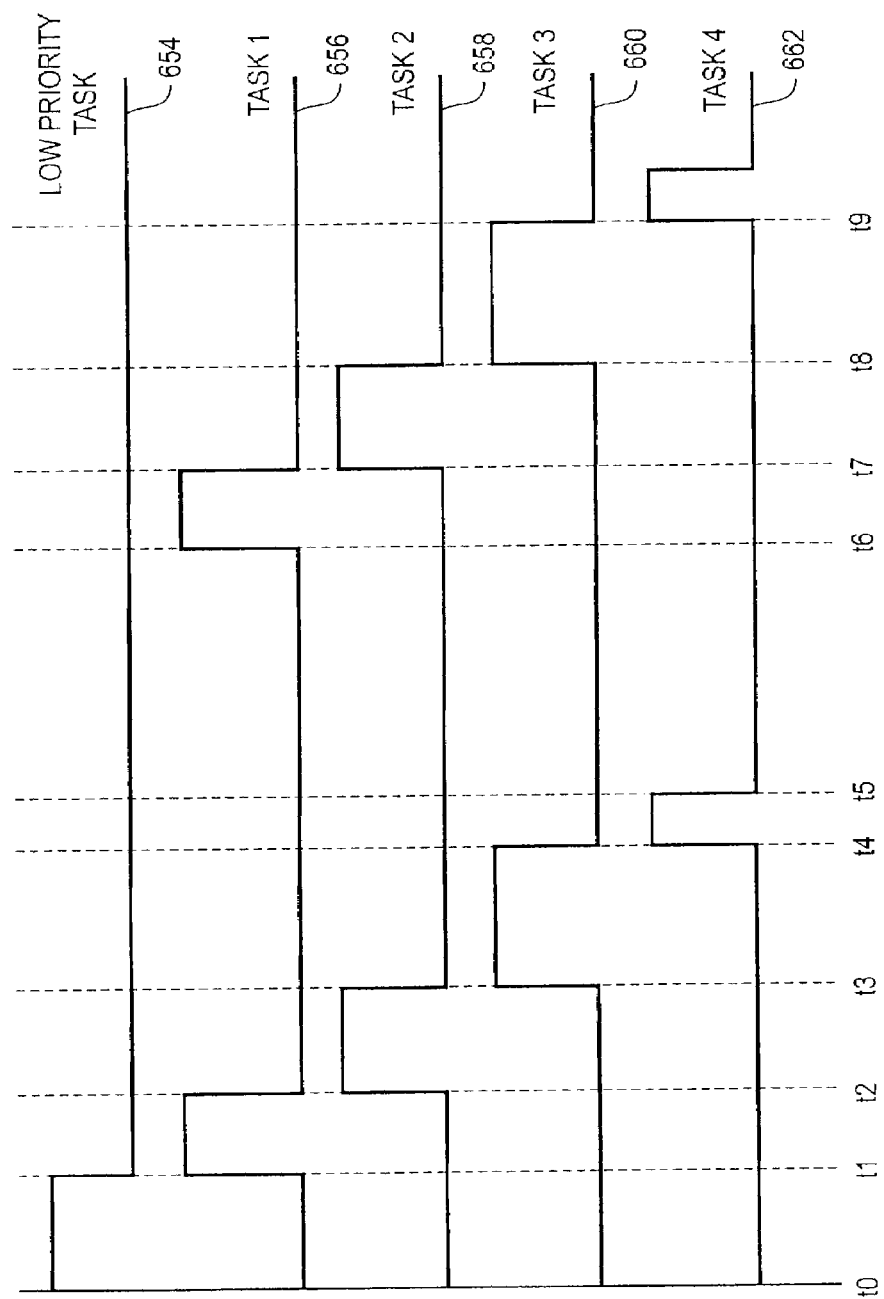
FIG. 6 is a timeline representing the operation of a block-out timer according to an illustrative embodiment of the present invention.

Referring to FIG. 6, a timing diagram illustrates an example of a critical instant analysis of a non-preemptive system. At time $t_0$, a task 1 656, a task 2 658, a task 3 660 and a task 4 662 request service at the same time. Further, at time $t_0$, a low priority task 654 is being serviced. Therefore, the highest priority task, the task 1, cannot be serviced until servicing of the low priority task has been completed. When the low priority task is completed at time $t_1$, the task 1 is serviced. Upon completion of the task 1 at time $t_2$, the task 2 is serviced. Upon completion of the task 2 at time $t_3$, the task 3 is serviced. Upon completion of the task 3 at time $t_4$, the task 4 is serviced. The task 4 completes at time $t_5$, which is before the start of a next set of tasks: the task 1 at $t_6$, the task 2 at $t_7$, the task 3 at $t_8$, and the task 4 at $t_9$.

Figure 7:
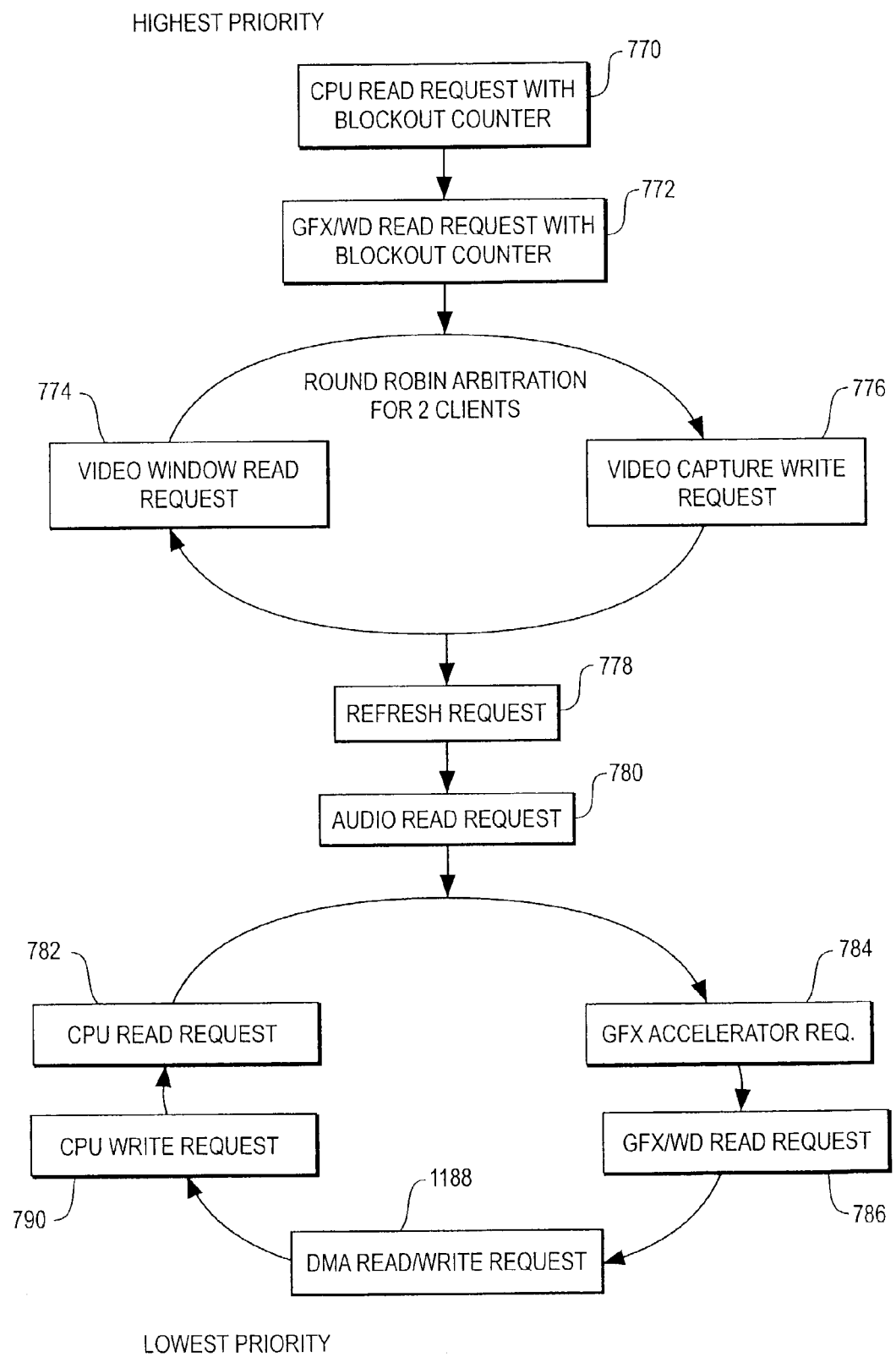
FIG. 7 is a flowchart representing servicing of requests according to the priority of the task.

For example, referring to FIG. 7, a flow diagram illustrates a process of servicing memory requests with different priorities, from the highest to the lowest, according to an exemplary embodiment of the present invention. The system in step 770 makes a CPU read request with the highest priority. Since a block-out timer is used with the CPU read request in this example, the block-out timer is started upon making the highest priority CPU read request. Then the system in step 772 makes a graphics read request. A block-out timer is also used with the graphics read request, and the block-out timer is started upon making the graphics read request.

A video window read request in step 774, a video capture write request in step 776, a refresh request in step 776 and an audio read request in step 778 are serviced in priority order.

While the block-out timer for the CPU read request is active, the system places the CPU read request in a round robin arbitration for four tasks (clients) in step 782. The system in steps 784, 788 and 790 places other lowest priority tasks such as a graphics accelerator read/write request, a DMA read/write request and a CPU write request, respectively, in this round robin arbitration with four clients.

Figure 8:
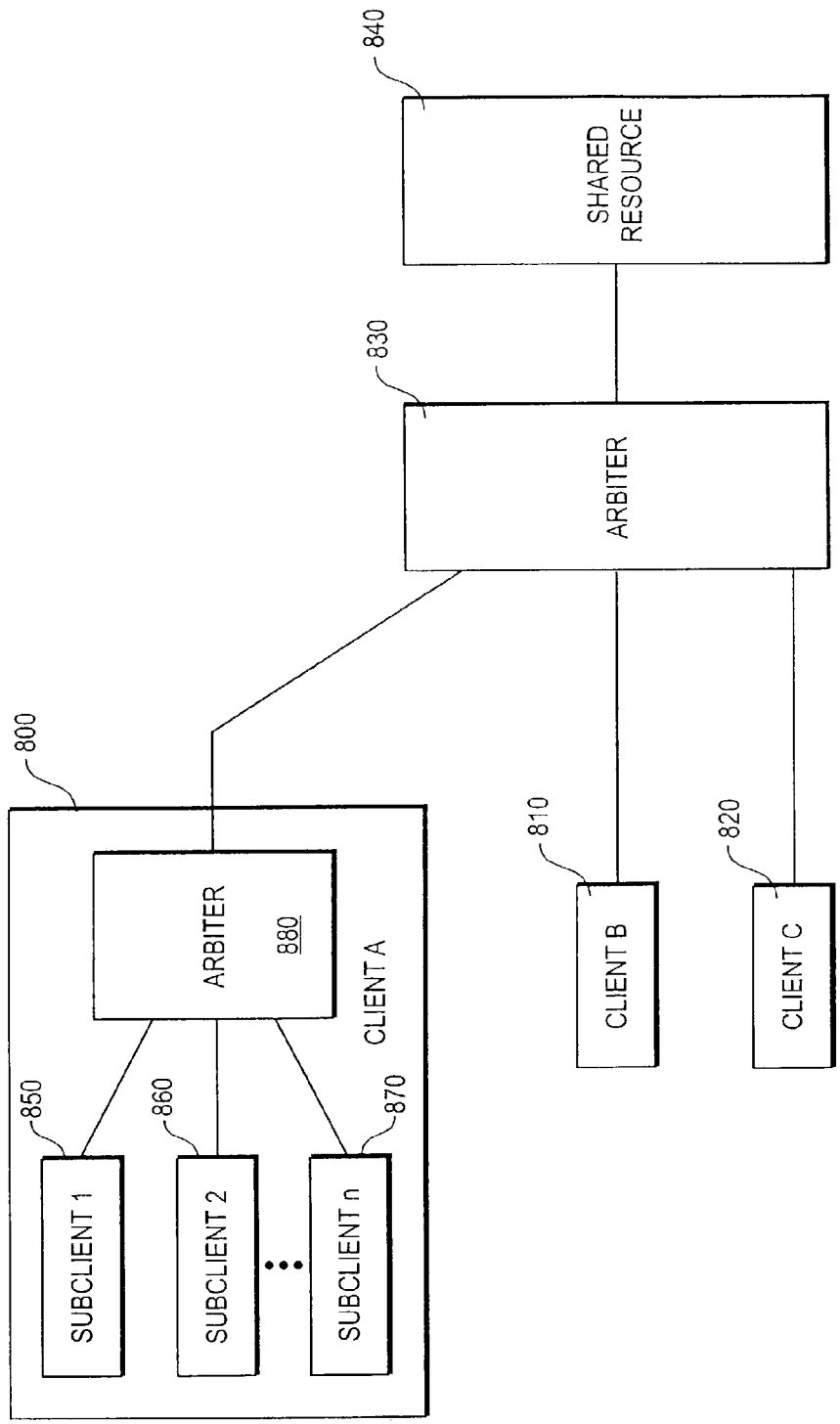
FIG. 8 is a functional block diagram representing a shared resource controller system according to an illustrative embodiment of the present invention.

According to an illustrative embodiment of the present invention, a client can split the memory access internally among multiple sub-clients, the client performing a second-level arbitration among the sub-clients within the client. Such a client will be sometimes referred to herein as an aggregate client. FIG. 8 is a functional block diagram of a shared resource control system having an aggregate client 800 according to an illustrative embodiment of the present invention. The Aggregate client 800 comprises sub-client 1 850, sub-client 2 860 and sub-client n 870. Arbiter 880 arbitrates access requests received from the sub-clients and provides an "aggregate" request to arbiter 830. Client B 810 and client C 820 also provide access requests to the arbiter 830, which in turn arbitrates the received requests and provides a request to shared resource 840.

In an exemplary embodiment of the present invention, the second level of arbitration, such as arbiter 880, uses a round-robin scheme to evenly service a number of different types of memory access. In another embodiment, second-level arbitration is performed within a module using fixed scheduling as dictated by a control machine where the order of servicing and processing are controlled together between sub-modules. For example, in one embodiment, audio PCM uses a control machine to read a list descriptor, and then based on the contents of the list, proceeds to setup and read/write multiple channels of audio PCM samples. Left unconstrained, clients that perform a second level arbitration tend to show a very bursty pattern of requests to memory. The present invention provides ways of scheduling systems that include clients that perform second level arbitrations and ways of analyzing such systems.

Figure 9:
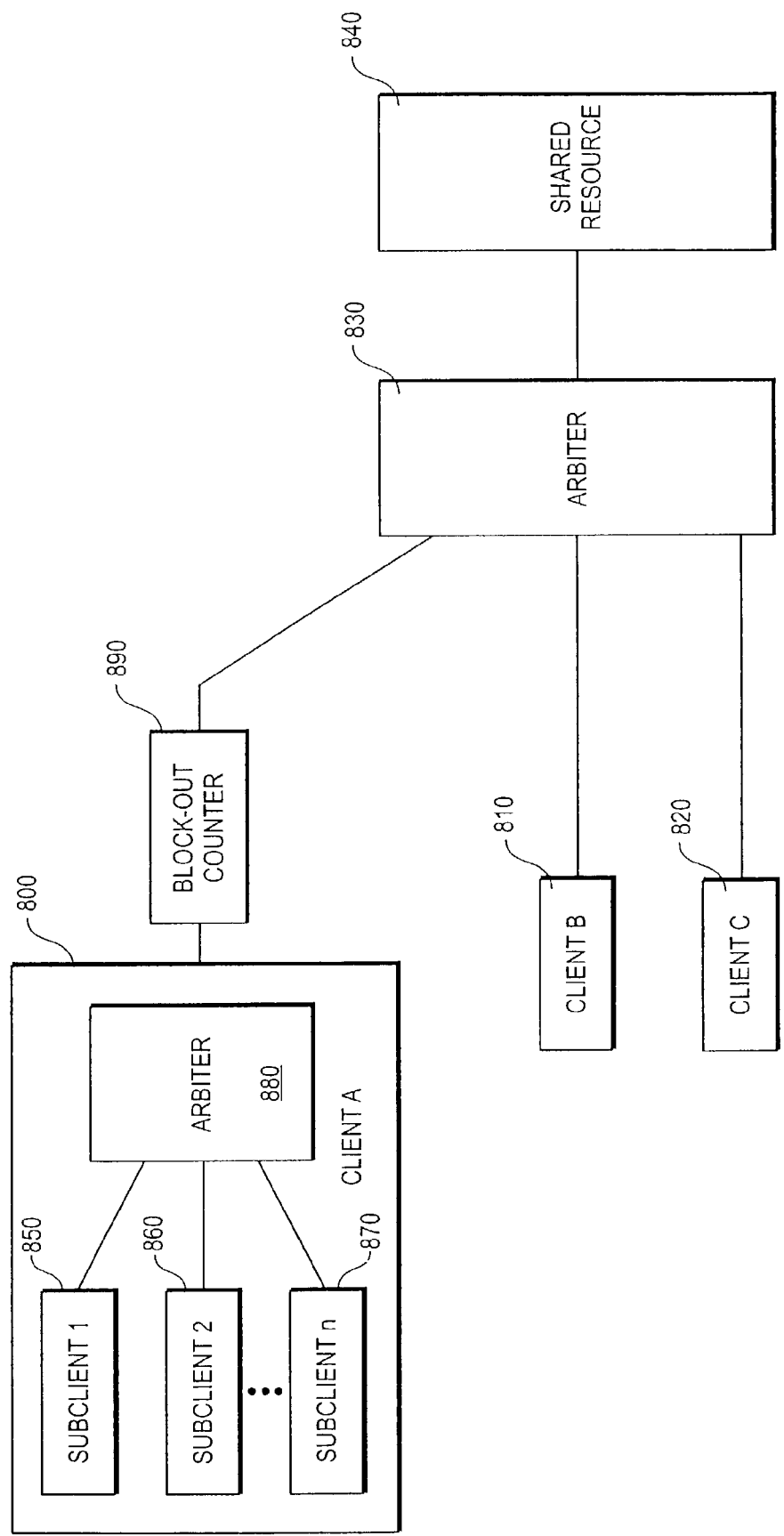
FIG. 9 is a functional block diagram representing a shared resource controller system according to an illustrative embodiment of the present invention.

In an exemplary embodiment of the present invention, a block-out counter is installed to regulate the period of requests provided by a client that uses second-level arbitration to the shared resource. FIG. 9 is a functional block diagram of a shared resource control system having an aggregate client 800 and employing a block-out counter 890, according to an illustrative embodiment of the present invention. In FIG. 9, elements that are equivalent to corresponding elements of FIG. 8 are given like reference numbers. The block-out counter 890 prevents the aggregate client 800 from making a request to the shared resource 840, such as DRAM, until some minimum interval has passed since the last request to the shared resource. By forcing a minimum interval between any two requests, the block-out timer 890 regulates the period of the module. In an illustrative embodiment, a block-out counter 890 is utilized for an aggregate client that has a variable burst size or a variable period.

In an illustrative embodiment of the present invention, the block-out period of the block-out timer 890 is programmed to the largest value that will allow the module to function correctly in all corner cases. This timer value is then treated as a periodic request and deadline for purposes of rate monotonic scheduling.

In an illustrative embodiment of the present invention, the period imposed by the block-out timer 890 on an aggregate client, such as client A 800, is substantially equal to $D_S/n$, where the aggregate client 800 comprises n sub-clients that can request access to the shared resource and where $D_S$ is the shortest service deadline among the n sub-clients. Take, for example, a client having three sub-clients that periodically require servicing by the shared resource. Sub-client A has a service deadline of 1 μs, sub-client B has a service deadline of 4 μs and sub-client C has a service deadline of 8 μs. The sub-client having the shortest service deadline is sub-client A, which has a service deadline of 1 μs. Because the aggregate client has three sub-clients, the block-out timer will impose a minimum period of ⅓ μs.

Figure 10:
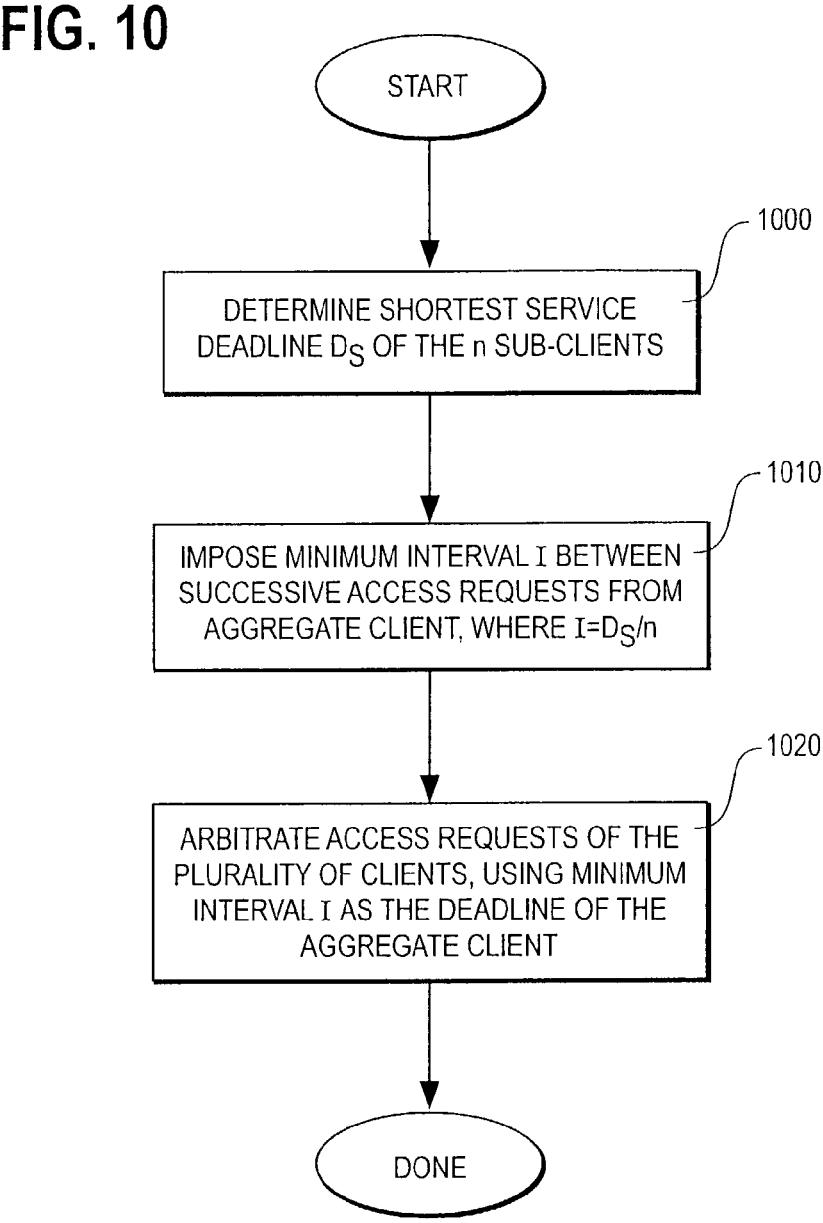
FIG. 10 is a flowchart representing a method of arbitrating requests for access to a shared real-time resource received from a plurality of client devices according to an illustrative embodiment of the present invention.

FIG. 10 is a flowchart representing a method of arbitrating requests for access to a shared real-time resource received from a plurality of client devices, one of the clients being an aggregate client comprising a plurality of sub-clients, wherein the aggregate client arbitrates among the sub-clients to provide an access request to the shared resource. At step 1000, the shortest service deadline $D_S$ of the n sub-clients is determined. At step 1010, a minimum interval I between successive access requests from the aggregate client is imposed, the minimum period being substantially equal to $D_S/n$. In an illustrative embodiment, the minimum interval is imposed by a block-out timer. At step 1020, access requests received from the plurality of clients are arbitrated, using the minimum interval I as the service deadline of the aggregate client. In an exemplary embodiment, the access requests are arbitrated using rate monotonic scheduling or deadline monotonic scheduling.

In an illustrative embodiment of the present invention, any access requests produced by an aggregate client, such as client A 800, while the block-out timer 890 is running are prevented from being provided to the arbiter 830 while the block-out timer 890 is running. In a further illustrative embodiment, the block-out timer 890 starts running when the aggregate client 800 provides an access request to the arbiter 830.

Figure 11:
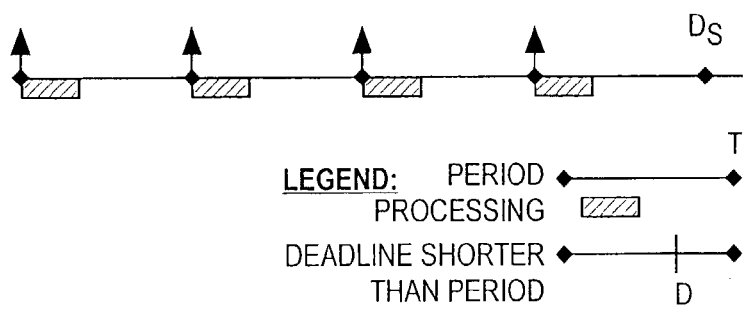
FIG. 11 is a timeline representing the critical instant behavior of an aggregate client according to an illustrative embodiment of the present invention.

In an illustrative embodiment of the present invention, a critical instant analysis of the system is performed, utilizing the imposed minimum interval I as the service deadline of the aggregate client for purposes of the critical instant analysis. In the critical instant analysis, the aggregate client 800 is assumed to request service at the same time as clients B 810 and C 820, and the aggregate client is assumed to request service at a periodic rate equal to the imposed minimum interval I. FIG. 11 is a timeline depicting the critical instant behavior of an aggregate client having four sub-clients having substantially similar service times. As can be seen in FIG. 11, in the critical instant analysis, the aggregate client is assumed to request service at a periodic rate equal to $D_S/4$.

Block-out counters can limit the behavior of the system during normal, non-critical-instant, operation. In an exemplary embodiment of the present invention, in order to circumvent this bottleneck in performance, an aggregate client is also serviced by a sporadic server (round-robin) during block-out time, in a manner similar to the system shown in FIG. 4. When there is low memory traffic utilization, the sub-clients can still get serviced at a high rate through the sporadic server, yet will not interfere during a critical instant. This is primarily used to give the CPU higher bandwidth in the system.

In an illustrative embodiment of the present invention, modules are designed so that if they are prevented from gaining access to memory by the block-out counter, the module will still function normally. This is usually not a problem, as the modules cannot distinguish if the stall comes from a block-out counter blocking the request, or if the memory controller has not yet prioritized and serviced the request.

There is a class of clients that incorporate second-level arbitration within the client and that are still generally real-time friendly. One embodiment of the present invention includes a round-robin arbitration internal to the client selecting among a set of periodic, fixed deadline, fixed burst-size sub-modules. If the sub-modules are well behaved and the round robin is well behaved, such a system is analyzed in a slightly different manner that may ease system bandwidth according to an illustrative embodiment of the present invention. For purposes of illustration, a graphics display module according to this embodiment of the present invention is described below.

Figure 12:
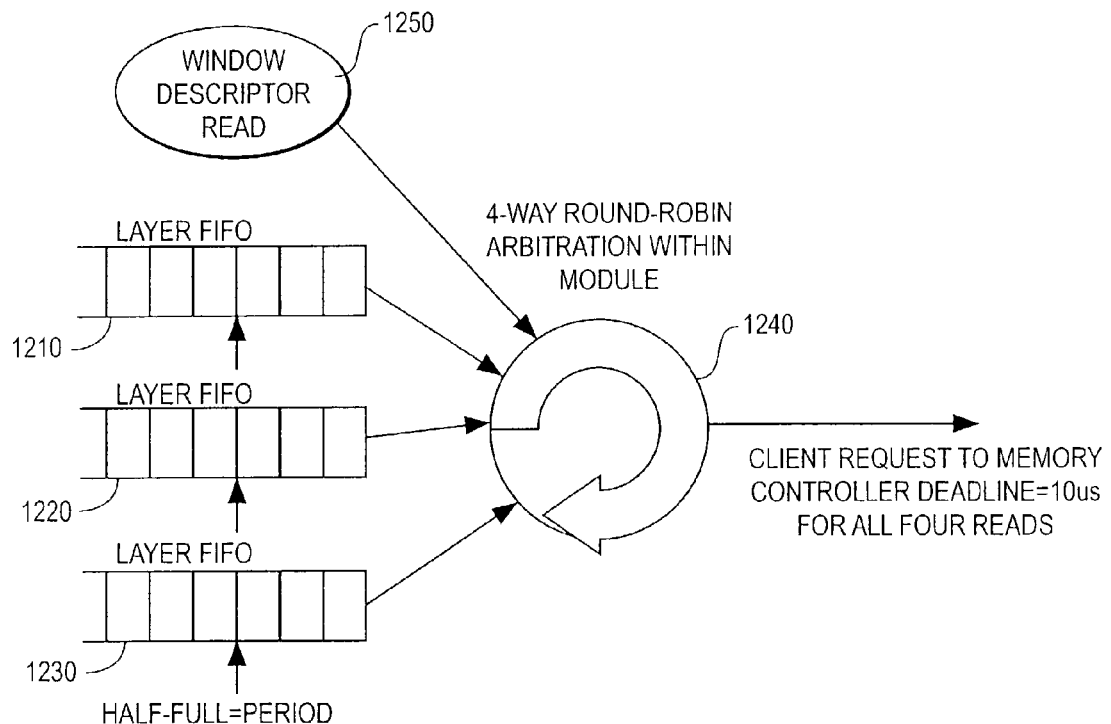
FIG. 12 is a functional block diagram representing an aggregate client utilizing a round-robin arbitration scheme according to an illustrative embodiment of the present invention.

FIG. 12 is a functional diagram representing a graphics display module operating in a shared memory system according to an illustrative embodiment of the present invention. The graphics display module includes three first-in first-out (FIFO) buffers 1210, 1220, 1230 operating in parallel. A round-robin arbitration scheme 1240 services the three FIFO buffers 1210, 1220, 1230. Each FIFO 1210, 1220, 1230 makes a request at the half-full mark, and each requests a burst size equal to half the FIFO size. For purposes of illustration, say each FIFO 1210, 1220, 1230 independently can operate for 10 µs between requests. Additionally there is a window descriptor 1250, which can be read at the start of a period. In the worst case, all three FIFOs 1210, 1220 and 1230 will hit the half-mark simultaneously, and the window descriptor 1250 will need to be read. The round-robin arbitration 1240 services the four requests sequentially and generates four DRAM requests from the client to the memory controller. Unconstrained, this looks like a burst of four reads from memory within a long period.

In the embodiment of the present invention described above with respect to, for example, FIGS. 9 and 10, a block-out counter is used with a module such as the graphics display module of FIG. 12 to limit the period of requests to ¼ the normal rate (10 µs/4=2.5 µs). The use of the block-out counter forces a deadline and a period that is much shorter than the actual deadline of the design, requiring a priority that is in line with a 2.5 µs deadline.

Figure 13:
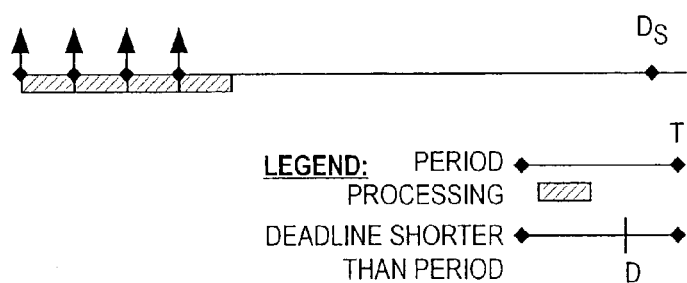
FIG. 13 is a timeline representing the critical instant behavior of an aggregate client according to an illustrative embodiment of the present invention.

In an alternative embodiment of the present invention, the entire 10 µs deadline is treated as the period, and a critical instant analysis is run including the four requests. Essentially, this looks like one client with a long deadline (10 µs) and a partially preemptive service time. The service time may be preempted at three points in time, after each sub-client is serviced by the shared resource. In an exemplary embodiment, this is modeled in the critical instant. FIG. 13 is a timeline depicting the critical instant behavior of the graphics display module of FIG. 12 according to an exemplary embodiment of the present invention. As can be seen in FIG. 13, in the critical instant analysis, the aggregate client is assumed to produce four consecutive requests. In the critical instant analysis, this is treated as a partially preemptable service time. The long period and deadline allows the aggregate client to be pushed to a lower priority than the same client operating with block-out counters does.

Figure 14:
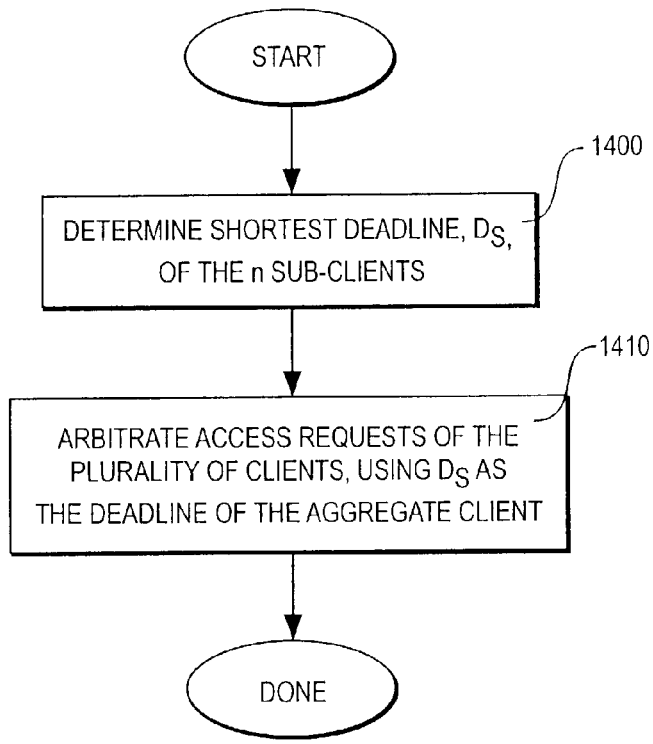
FIG. 14 is a flowchart representing a method of arbitrating requests for access to a shared real-time resource received from a plurality of client devices according to an illustrative iment of the present invention.

FIG. 14 is a flowchart representing a method of arbitrating requests for access to a shared real-time resource received from a plurality of client devices, one of the clients being an aggregate client comprising a plurality of sub-clients. At step 1400, the shortest service deadline, $D_S$, of the plurality of sub-clients is determined. At step 1410, access requests received from the plurality of clients are arbitrated using rate monotonic scheduling or deadline monotonic scheduling. The shortest service deadline of the plurality of sub-clients is used as the service deadline of the aggregate client.

Figure 15:
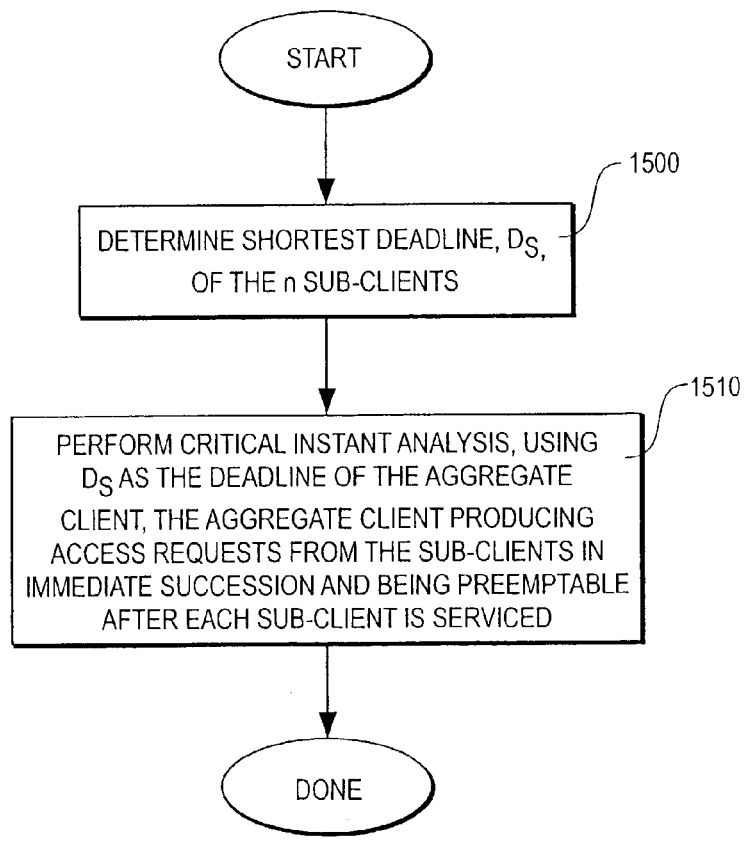
FIG. 15 is a flowchart representing a method of analyzing the schedulability of a non-preemptive system that employs rate monotonic scheduling according to an illustrative embodiment of the present invention.

FIG. 15 is a flowchart representing a method of analyzing the schedulability of a real-time system that employs rate monotonic scheduling or deadline monotonic scheduling to determine access priority of a plurality of client devices to a shared resource, one of the clients being an aggregate client. At step 1500, the shortest service deadline, $D_S$, of the plurality of sub-clients is determined. A critical instant analysis of the system comprising the plurality of clients is performed. The shortest service deadline of the plurality of sub-clients is utilized as the service deadline of the aggregate client for purposes of the critical instant analysis. At the critical instant, the aggregate client produces access requests from each of the sub-clients in immediate succession. The aggregate client is preemptable after each sub-client is serviced by the shared resource. Within the deadline $D_S$, all sub-clients must be serviced. If the sub-clients operate independently, it does not matter if all are serviced in regular intervals, or are serviced anytime within this deadline. This implies that the aggregate client will make n requests during a single period, one for each of n subclients. All n requests must be serviced within the deadline $D_S$.

In an illustrative embodiment of the present invention, the scheduling and analysis methods described above with respect to FIGS. 12–15 are not employed when the sub-modules internally are serially dependent upon each other. In other words, in that illustrative embodiment, the scheduling and analysis methods described with respect to FIGS. 12–15 are employed where the module will work correctly if any of the sub-modules are serviced any time within the deadline (10 μs, e.g.). Also, in an illustrative embodiment, where the module will work correctly if any of the sub-modules are serviced any time within the deadline, the system is modeled two ways: with and without the block-out counters, as other factors may make either solution optimal. Whichever method is shown to be optimal according to the modeling is then employed. Additionally, in an exemplary embodiment of the present invention, clients are designed so that there is not a mix of real-time and non-real time sub-modules within the same arbitration.

In the scheduling and analysis methods of FIGS. 12–15, the priority of the aggregate client is determined by the shortest priority of the sub-modules. The critical instant is started with a request from all internal sub-modules simultaneously to the round-robin internal arbiter. This generates a request to the memory controller arbiter. This arrives at the memory controller at the same time as all higher priority clients, and just after the blocking task starts service.

As previously mentioned, the scheduling and analysis methods of FIGS. 12–15 is particularly suitable for systems that include clients that have second levels of arbitration and that are generally real-time friendly. One type of client that fits this description includes a round-robin arbitration internal to the client selecting among a set of periodic, fixed deadline, fixed burst-size sub-modules. Some modules that may exhibit this type of behavior are a graphics display and a PCM audio module of a video transmission/reception system. Other modules may also be suitable. In an illustrative embodiment of the present invention, an MPEG decoder may be treated as a multi-request client where the requests are grouped together from multiple macroblocks, resulting in a deadline that is longer than a macroblock. This is a deviation from the absolute worst case, but may be acceptable depending upon the size of the group, and the ability of the MPEG decoder to recover from late memory response by decoding faster on future macroblocks within the frame. Given that an MPEG decoder can decode faster than real time, it is too conservative to constrain a single request to a single macroblock time. It may be too lenient to aggregate requests over an entire frame time—even in a system with four frame stores. In an exemplary embodiment, some analysis would be done to see if aggregating requests over a row of macroblocks is acceptable.

In another embodiment of the present invention, in a system, such as the system shown in FIG. 8, having an aggregate client 800 that has a plurality of sub-clients 850, 860, 870, an aggregate deadline is determined for the aggregate client and the access requests received from the aggregate client 800 and the other clients 810, 820 are arbitrated, using the aggregate deadline as the deadline of the aggregate client 800 for the purposes of rate monotonic or deadline monotonic scheduling. In an illustrative embodiment of the present invention, the aggregate deadline $D_A$ of an aggregate client is determined according to the relation:

$$D_A = \frac{1}{\sum_{i=1}^{n} \frac{1}{D_i}}$$

where the aggregate client aggregates n sub-clients and $D_i$ is the service deadline of the $i^{th}$ sub-client. In an exemplary embodiment of the present invention, a block-out counter is used to impose a period equal to $D_A$ on the aggregate client. For example, take a system having an aggregate client that has three sub-clients. Sub-client 1 has a service deadline of 1 μs, sub-client 2 has a service deadline of 4 μs and sub-client 3 has a service deadline of 8 μs. The aggregate deadline of the aggregate client would then be:

$$D_A = \frac{1}{\frac{1}{D_1} + \frac{1}{D_2} + \frac{1}{D_3}} = \frac{1}{\frac{1}{1} + \frac{1}{4} + \frac{1}{8}} = \frac{8}{11} = .7273$$

The block-out counter thus imposes a period of 0.7273 μs on the aggregate client. If the same sub-clients were arbitrated using a round-robin scheme regulated with a block-out counter, the period would be 0.333 μs, as explained above with respect to FIG. 9. Thus it can be seen that imposing a period equal to $D_A$ results in a more efficient system than using a round-robin with a block-out counter. According to an illustrative embodiment of the present invention, the aggregate client is treated at a higher level as a single client. This may be expanded to multiple depths. By aggregating sub-clients into clients, a hierarchy of client arbitration can be created. It is recognized that many modules are designed with fixed memory bandwidth and that later re-designs or feature additions require additional memory interfaces. Aggregating sub-clients into clients allows for expansion of module features without requiring another bus. This eases layout issues at the chip level. Aggregating sub-clients into clients also eliminates the need for additional client arbitration at the DRAM (or other shared resource) controller.

FIG. 16 is a flowchart representing a method of arbitrating requests for access to a shared real-time resource received from a plurality of client devices, one of the clients being an aggregate client comprising a plurality of sub-clients. At step 1600, a plurality of sub-clients are aggregated into an aggregate client. At step 1610, at the aggregate client, access requests from the plurality of sub-clients are arbitrated using rate monotonic scheduling or deadline monotonic scheduling, to generate an aggregate request. The arbitration of sub-clients is done in priority order according to the deadlines of the sub-clients. At step 1620 the aggregate deadline of the aggregate client is determined. At step, 1630, any access requests received from the aggregate client and the other clients are arbitrated, using the aggregate deadline as the deadline of the aggregate client. In an exemplary embodiment, a block-out counter is used to impose a period on the aggregate client equal to the aggregate deadline.

In one embodiment of the present invention, a critical instant analysis of the system is performed, utilizing the aggregate service deadline as the service deadline of the aggregate client for purposes of the critical instant analysis.

According to an illustrative embodiment of the present invention, in cases where an aggregate client is modeled without a block-out counter, the initial condition uses the longest sub-module service time as a potential blocking task for higher priority clients. If a multi-request client is blocking a higher priority client in the initial conditions for a higher priority client, then the block-out time is the longest of the sub-module requests from the multi-request client. During run-time simulations, a multi-request client makes continuous requests at the start of each period. The end condition for a multi-requesting client is determined as a pass if all sub-modules are serviced within each of their periods.

Although a preferred embodiment of the present invention has been described, it should not be construed to limit the scope of the appended claims. For example, the present invention may be employed with any type of resource that is shared among a plurality of client devices, in addition to the shared memory module illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A method of arbitrating requests for access to a shared real-time resource received from a plurality of client devices, the method comprising:
   (a) aggregating a plurality of sub-clients into an aggregate client; and
   (b) arbitrating access requests received from the aggregate client and a plurality of clients using one of rate monotonic scheduling and deadline monotonic scheduling, wherein arbitrating access requests comprises determining an aggregate service deadline $D_A$ of the aggregate client for use in the one of rate monotonic scheduling and deadline monotonic scheduling according to the relation:

$$D_A = \frac{1}{\sum_{i=1}^{n} \frac{1}{D_i}}$$

where the aggregate client aggregates n sub-clients and $D_i$ is the service deadline of the $i^{th}$ sub-client.

2. The method of claim 1 wherein aggregating step (a) comprises arbitrating access requests received from the plurality of sub-clients to produce an aggregate request.

3. The method of claim 2 wherein aggregating step (a) comprises arbitrating the access requests using one of rate monotonic scheduling and deadline monotonic scheduling.

4. The method of claim 1 wherein aggregating step (a) comprises arbitrating access requests received from the plurality of sub-clients to produce an aggregate request.

5. The method of claim 4 wherein aggregating step (a) comprises arbitrating the access requests using one of rate monotonic scheduling and deadline monotonic scheduling.

6. A method of arbitrating requests for access to a shared real-time resource received from a plurality of client devices, the method comprising:
   (a) aggregating a plurality of sub-clients into an aggregate client;
   (b) imposing a minimum interval between successive access requests from the aggregate client, the minimum interval being substantially equal to an aggregate service deadline $D_A$ of the aggregate client, wherein $D_A$ is determined according to the relation:

$$D_A = \frac{1}{\sum_{i=1}^{n} \frac{1}{D_i}}$$

where the aggregate client aggregates n sub-clients and $D_i$ is the service deadline of the $i^{th}$ sub-client; and
   (c) arbitrating access requests received from the aggregate client and a plurality of clients.

7. The method of claim 6 wherein imposing step (b) comprises coupling a block-out timer to the aggregate client, the block-out timer adapted to impose a minimum interval between successive access requests from the aggregate client.

8. A method of analyzing the schedulability of a real-time system that employs one of rate monotonic scheduling and deadline monotonic scheduling to determine access priority of a plurality of client devices to a shared resource, the method comprising:
   (a) aggregating a plurality of sub-clients into an aggregate client having an aggregate service deadline determined according to the relation:

$$D_A = \frac{1}{\sum_{i=1}^{n} \frac{1}{D_i}}$$

where the aggregate client aggregates n sub-clients and $D_1$ is the service deadline of the $i^{th}$ sub-client; and
   (b) performing a critical instant analysis of the system, the system comprising the aggregate client and a plurality of other clients, wherein the aggregate service deadline is utilized as the service deadline of the aggregate client for purposes of the critical instant analysis.

9. The method of claim 8 wherein aggregating step (a) comprises imposing a minimum interval between successive access requests from the aggregate client, the minimum interval being substantially equal to the aggregate service deadline $D_A$.

10. The method of claim 9 wherein aggregating step (a) comprises coupling a block-out timer to the aggregate client, the block-out timer adapted to impose a minimum interval between successive access requests from the aggregate client, the minimum interval being substantially equal to the aggregate service deadline $D_A$.

11. The method of claim 8 wherein aggregating step (a) comprises arbitrating access requests received from the plurality of sub-clients to produce an aggregate request.

12. The method of claim 11 wherein aggregating step (a) comprises arbitrating the access requests using one of rate monotonic scheduling and deadline monotonic scheduling.

13. The method of claim 12 wherein aggregating step (a) comprises arbitrating the access requests according to the service deadlines of the sub-clients.

14. The method of claim 8 further comprising a step (c), performed prior to performing step (b), of:

(c) coupling a block-out timer to at least one of the sub-clients, the block-out timer adapted to impose a minimum interval between successive access requests from the corresponding sub-client.

15. A method of arbitrating requests for access to a shared real-time resource received from a plurality of client devices, one of the clients being an aggregate client comprising a plurality of sub-clients, wherein the aggregate client arbitrates among the sub-clients to provide an access request to the shared resource, the method comprising:
(a) imposing a minimum interval between successive access requests from the aggregate client, wherein the duration of the imposed minimum interval is substantially equal to $D_S/n$, where $D_S$ is the duration of the shortest service deadline of the sub-clients and where the aggregate client aggregates n sub-clients; and
(b) arbitrating access requests received from the plurality of clients.

16. The method of claim 15 wherein imposing step (a) comprises coupling a block-out timer to the aggregate client, the block-out timer adapted to impose the minimum interval between successive access requests from the aggregate client.

17. The method of claim 16 wherein any access requests produced by the aggregate client while the block-out timer is running are prevented from being provided to the shared resource while the block-out timer is running.

18. The method of claim 17 wherein the block-out timer is adapted to start running when the aggregate client makes an access request.

19. A method of arbitrating requests for access to a shared real-time resource received from a plurality of client devices, one of the clients being an aggregate client comprising a plurality of sub-clients, wherein the aggregate client arbitrates among the sub-clients to provide an access request to the shared resource, the method comprising:
(a) imposing a minimum interval between successive access requests from the aggregate client; and
(b) arbitrating access requests received from the plurality of clients using one of rate monotonic scheduling and deadline monotonic scheduling, wherein a service deadline of the aggregate client, for purposes of the one of rate monotonic scheduling and deadline monotonic scheduling, is substantially equal to the duration of the imposed minimum interval.

20. The method of claim 19 wherein the duration of the imposed minimum interval is substantially equal to $D_S/n$, where $D_S$ is the duration of the shortest service deadline of the sub-clients and where the aggregate client aggregates n sub-clients.

21. A method of analyzing the schedulability of a real-time system that employs one of rate monotonic scheduling and deadline monotonic scheduling to determine access priority of a plurality of client devices to a shared resource, one of the clients being an aggregate client comprising a plurality of sub-clients, wherein the aggregate client arbitrates among the sub-clients to provide an access request to the shared resource, the method comprising:
(a) imposing a minimum interval between successive access requests from the aggregate client, wherein the duration of the imposed minimum interval is substantially equal to $D_S/n$ where $D_S$ is the duration of the shortest service deadline of the sub-clients and where the aggregate client aggregates n sub-clients; and
(b) performing a critical instant analysis of the system comprising the plurality of clients, wherein the imposed minimum interval is utilized as the service deadline of the aggregate client for purposes of the critical instant analysis.

22. The method of claim 21 wherein imposing step (a) comprises coupling a block-out timer to the aggregate client, the block-out timer adapted to impose the minimum interval between successive access requests from the aggregate client.

23. The method of claim 22 wherein any access requests produced by the aggregate client while the block-out timer is running are prevented from being provided to the shared resource while the block-out timer is running.

24. The method of claim 23 wherein the block-out timer is adapted to start running when the aggregate client makes an access request.

* * * * *